(12) United States Patent
Taeger et al.

(10) Patent No.: US 8,187,519 B2
(45) Date of Patent: May 29, 2012

(54) PROCESS FOR MAKING A DIE BY LASER ENGRAVING AND USING THE DIE FOR THE PRODUCTION OF A SURFACE-STRUCTED COATING

(75) Inventors: Tilman Ludecke Taeger, Seeheim-Jugenheim (DE); Elmar Kebenich, Ludwigshafen (DE); Klaus Schultze, Frankenthal (DE); Jens Schadebrodt, Mainz (DE)

(73) Assignee: BASF SE, Ludwigshafen (DE)

( * ) Notice: Subject to any disclaimer, the term of this patent is extended or adjusted under 35 U.S.C. 154(b) by 430 days.

(21) Appl. No.: 12/066,961

(22) PCT Filed: Sep. 20, 2006

(86) PCT No.: PCT/EP2006/066527
§ 371 (c)(1), (2), (4) Date: Mar. 14, 2008

(87) PCT Pub. No.: WO2007/033968
PCT Pub. Date: Mar. 29, 2007

(65) Prior Publication Data
US 2008/0224356 A1    Sep. 18, 2008

(30) Foreign Application Priority Data
Sep. 21, 2005   (DE) .......................... 10 2005 045 047

(51) Int. Cl.
| | |
|---|---|
| *B29C 33/40* | (2006.01) |
| *B29C 35/08* | (2006.01) |
| *B29C 39/00* | (2006.01) |
| *B29C 41/00* | (2006.01) |
| *B28B 1/14* | (2006.01) |
| *H05B 6/00* | (2006.01) |
| *B32B 9/02* | (2006.01) |
| *B32B 9/04* | (2006.01) |
| *A01J 21/00* | (2006.01) |
| *A01J 25/12* | (2006.01) |

(52) U.S. Cl. ........ 264/400; 264/299; 264/337; 264/482; 428/473; 425/403

(58) Field of Classification Search ..................... 156/68
See application file for complete search history.

(56) References Cited

U.S. PATENT DOCUMENTS
5,759,473 A    6/1998   Minke et al.
(Continued)

FOREIGN PATENT DOCUMENTS
| DE | 43 24 970 A1 | 1/1995 |
|---|---|---|
| DE | 102 58 668 A1 | 6/2004 |
| DE | 202005003532 * | 6/2005 |

(Continued)

OTHER PUBLICATIONS

Machine translation of DE 4324970 A1.*

*Primary Examiner* — Christina Johnson
*Assistant Examiner* — Benjamin Schiffman
(74) *Attorney, Agent, or Firm* — Connolly Bove Lodge & Hutz LLP (57) ABSTRACT

The invention relates to a process for the production of a die for the production of a surface-structured coating which can be bonded to a sheet-like substrate, in particular a leather or a textile material, and which is formed by application of a liquid plastic material to the surface of the die and subsequent solidification of the plastic material, the die having a surface structure corresponding to the surface structure of the coating, wherein the surface structure of the die is produced by laser engraving.

19 Claims, 4 Drawing Sheets

U.S. PATENT DOCUMENTS

| | | | |
|---|---|---|---|
| 5,762,742 A * | 6/1998 | Maitan et al. | 156/219 |
| 5,798,202 A * | 8/1998 | Cushner et al. | 430/306 |
| 6,261,489 B1 * | 7/2001 | Matsuki et al. | 264/45.4 |
| 6,337,749 B1 * | 1/2002 | Hartel et al. | 264/400 |
| 7,758,012 B2 * | 7/2010 | Schafer | 249/55 |
| 2002/0124954 A1 | 9/2002 | Maker et al. | |
| 2002/0136969 A1 | 9/2002 | Hiller et al. | |
| 2006/0112844 A1 | 6/2006 | Hiller et al. | |
| 2007/0082176 A1 | 4/2007 | Schaefer | |
| 2009/0242112 A1 * | 10/2009 | Taeger et al. | 156/272.8 |

FOREIGN PATENT DOCUMENTS

| | | |
|---|---|---|
| EP | 0 640 043 | 3/1995 |
| EP | 0 640 044 | 3/1995 |
| EP | 0 712 706 A2 | 5/1996 |
| EP | 1 080 883 A2 | 3/2001 |
| EP | 1 238 789 A1 | 9/2002 |
| WO | WO-93/23252 | 11/1993 |
| WO | WO-93/23253 | 11/1993 |
| WO | WO-2005/047549 | 5/2005 |
| WO | WO-2006/092440 A1 | 9/2006 |

* cited by examiner

PROCESS FOR MAKING A DIE BY LASER ENGRAVING AND USING THE DIE FOR THE PRODUCTION OF A SURFACE-STRUCTED COATING

CROSS REFERENCE TO RELATED APPLICATIONS

This application is a National Phase filing under 35 U.S.C. §371 of PCT/EP2006/066527 filed Sep. 20, 2006, which claims priority to Patent Application No. 102005045047.4, filed in Germany on Sep. 21, 2005. The entire contents of each of the above-applications are incorporated herein by reference.

BACKGOUND OF THE INVENTION

1. Field of the Invention

The present invention relates to a process for the production of dies for the production of a coating (decorative finish) which can be bonded to a sheet-like substrate, in particular a leather or a textile material, such as a nonwoven, woven fabric or knitted fabric, and which is formed by application of a liquid plastic material to the surface of the die and subsequent solidification of the plastic material. The invention furthermore relates to laser-engraved dies which are obtainable by the process.

2. Description of Related Art

In the direct laser engraving technique, a three-dimensional structure is engraved directly into a material surface. This technique has attracted broader economic interest only in recent years with the appearance of improved laser systems. The improvements in the laser systems include better focusability of the laser beam, higher power and computer-controlled beam guidance.

Direct laser engraving has a plurality of advantages over conventional, for example mechanical, structuring processes. For example, three-dimensional motif elements can be individually formed in the laser engraving technique. Certain elements can be produced so as to be different from other elements, for example with regard to depth and steepness. Furthermore, in principle any digital original motif can be engraved into a material surface by means of the laser engraving technique after suitable conversion into a three-dimensional relief image, whereas, in conventional structuring techniques, the three-dimensional shape of an element is limited either by a natural three-dimensional original or the geometry of the imaging tool. Finally, the laser engraving process is highly automatable so that the entire process is not very susceptible to individual errors and is very readily reproducible. In this way, structured materials can be produced in high constant quality.

EP-A 0 640 043 and EP-A 0 640 044 disclose, respectively; one-layer and multilayer elastomeric laser-engravable recording elements for the production of flexographic printing plates. The elements consist of reinforced elastomeric layers. For the production of the layer, elastomeric binders, in particular thermoplastic elastomers, such as SBS, SIS or SEBS block copolymers, are used. As a result of the so-called reinforcement, the mechanical strength of the layer is increased in order to permit flexographic printing. The reinforcement is achieved either by introducing suitable fillers, photochemical or thermochemical crosslinking or combinations thereof.

WO 2005/047549 describes a process for the production of a finish for leather, in which the finish is produced on a silicone rubber substrate, the substrate having a structured surface, corresponding to the grain structure of the finish. Furthermore, a process for the production of a substrate provided on its visible side with a finish having a grain structure, in particular a grain leather, a split leather having a buffed top or a synthetic suede material having a top consisting of microfibers, is disclosed, first, for the formation of the finish, an aqueous plastic dispersion being applied to a substrate consisting of a silicone rubber and having a structured surface corresponding to the grain structure of the finish and being left to solidify to form a film.

BRIEF SUMMARY OF THE INVENTION

It is an object of the invention to provide a process for the production of dies for the production of surface-structured decorative finishes, such as finishes for the coating of leather, the present day high requirements of such coatings with regard to water permeability, fastness and abrasion resistance being met. It is a substantial object of the invention in particular to provide a suitable process for the production of coatings which meet the high requirements of the automotive industry with regard to fastness and haptic properties for the interior trim.

DETAILED DESCRIPTION OF THE INVENTION

The object is achieved by a process for the production of dies for the production of surface-structured coatings which can be bonded to a sheet-like substrate, in particular a leather or a textile material, such as a nonwoven, woven fabric or knitted fabric, and which is formed by application of a liquid plastic material to the surface of the die and subsequent solidification of the plastic material, the dies having a surface structure corresponding to the surface structure of the coating, the surface structure of the die being produced by laser engraving. For this purpose, the die has a laser-engravable layer. The laser structuring process is also particularly advantageous because logos, trademarks, latent images or design elements can be integrated very easily into the technically required surface structuring even at the digital level and can be produced in one operation.

In general, the laser-engravable layer is a polymer layer. This may be present on a substrate. A precondition for the production of the dies by means of laser engraving is that the laser radiation is absorbed by the polymer layer. Furthermore, a certain laser beam threshold energy has to be introduced into the polymer layer in order for laser engraving to be possible as a rule. The absorption of the recording layer for the chosen laser radiation should be as high as possible (the mean power density is typically >12 kW/cm$^2$ at a focus diameter of 100 µm).

In the laser structuring of the polymer layers, large amounts of material must be removed. Powerful lasers are therefore preferred. For example, $CO_2$ lasers having a wavelength of 10 640 nm can be used for the laser structuring. Very powerful $CO_2$ lasers are commercially available. As a rule, many polymers absorb radiation having a wavelength in the region of 10 µm. They can therefore be readily engraved with $CO_2$ lasers. Furthermore, for the laser structuring of the polymer layers, it is possible to use solid-state lasers having wavelengths of about 1 µm. Examples are powerful Nd/YAG lasers having a wavelength of 1064 nm. Nd/YAG lasers have the advantage over $CO_2$ lasers that, owing to the substantially shorter wavelength, considerably higher resolutions are possible so that substantially finer structures can be engraved into the surface of the dies. Many polymers absorb the wavelength of solid-state lasers only to a small degree, if at all. Substances absorbing IR radiation can then be mixed with the laser-engravable polymer layer in order to increase the sensitivity. With the use of Nd/YAG lasers, the engraving frequently becomes possible only by the use of IR absorbers, while the speed of engraving can be increased with the use of $CO_2$ lasers. Suitable absorbers comprise strongly colored pigments, such as carbon black, or IR-absorbing dyes, which are usually strongly colored.

For engraving the surface structure, the laser-engravable layer is moved relative to the laser or to the laser component emitting the laser beam or the laser pulse (also referred to below as "laser" for short) and the laser is electronically modulated according to the movement, with the result that the desired pattern is produced.

For example, the laser-engravable layer or a suitable layer composite can be applied to a cylinder and the cylinder caused to rotate, and the cylinder can be moved in the axial direction and the laser modulated under electronic control according to the movement of the cylinder. However, it is also possible for the laser-engravable layer or the layer composite to be arranged in a planar manner and laser-engravable layer and laser to be moved relative to one another in the plane of the layer or of the layer composite, and for the laser to be modulated under electronic control according to the relative movement.

In a preferred embodiment, the process according to the invention comprises the steps:
a) provision of a laser-engravable elastomeric layer or of a layer composite comprising a laser-engravable elastomeric layer, if appropriate on a substrate, the laser-engravable layer comprising a binder and further additives and assistants,
b) thermochemical, photochemical or actinic reinforcement of the laser-engravable elastomeric layer,
c) engraving of the die surface structure corresponding to the surface structure of the surface-structured coating into the laser-engravable elastomeric layer using a laser.

The laser-engravable layer or the layer composite may be present on a substrate; usually, it is present on a substrate. Examples of suitable substrates comprise woven fabrics and sheets of polyethylene terephthalate (PET), polyethylene naphthalate (PEN), polybutylene terephthalate, polyethylene, polypropylene, polyamide or polycarbonate, preferably PET or PEN sheets. Also suitable as substrates are papers and knitted fabrics, for example of cellulose. Conical or cylindrical tubes of said materials, so-called sleeves, can also be used as substrates. Glass fiber fabrics or composite materials comprising glass fibers and suitable polymeric materials are also suitable for sleeves. Other suitable substrate materials are metallic substrates, such as, for example, solid or fabric-like, sheet-like or cylindrical substrates of aluminum, steel, magnetizable spring steel or iron alloys.

The substrate can optionally be coated with an adhesion-promoting layer for better adhesion of the laser-engravable layer.

The laser-engravable layer comprises at least one binder, which may also be a prepolymer and which reacts in the course of a thermochemical reinforcement to form a polymer. Suitable binders are chosen by the person skilled in the art according to the desired properties of the laser-engravable layer or of the die, for example with regard to hardness, resilience or flexibility. Suitable binders can be divided substantially into 3 groups, without there being any intention to limit the binders thereto.

The first group comprises those binders which have ethylenically unsaturated groups. The ethylenically unsaturated groups are crosslinkable photochemically, thermochemically, by means of electron beams or by means of any desired combination of these processes. In addition, mechanical reinforcement by means of fillers can be carried out. Such binders are, for example, those which contain 1,3-diene monomers, such as isoprene or butadiene, incorporated in the form of polymerized units. The ethylenically unsaturated group may either act as a chain building block of the polymer (1,4-incorporation) or they can be bonded to the polymer chain as a side group (1,2-incorporation). Natural rubber, polybutadiene, polyisoprene, styrene/butadiene rubber, nitrile/butadiene rubber, acrylonitrile/butadiene/styrene (ABS) polymer, butyl rubber, styrene/isoprene rubber, polychloroprene, polynorbornene rubber, ethylene/propylene/diene rubber (EPDM) or polyurethane elastomers having ethylenically unsaturated groups may be mentioned as examples.

Further examples comprise thermoplastic elastomeric block copolymers of alkenylaromatics and 1,3-dienes. The block copolymers may be either linear block copolymers or radial block copolymers. Usually, they are three-block copolymers of the A-B-A type, but they may also be two-block polymers of the A-B type, or those having a plurality of alternating elastomeric and thermoplastic blocks, e.g. A-B-A-B-A. Blends of two or more different block copolymers can also be used. Commercial three-block copolymers frequently comprise certain proportions of two-block copolymers. The diene units may be 1,2- or 1,4-linked. Block copolymers of both the styrene/butadiene and the styrene/isoprene type can be used. They are commercially available, for example, under the name Kraton®. Thermoplastic elastomeric block copolymers having terminal blocks of styrene and a random styrene/butadiene middle block, which are available under the name Styroflex® can furthermore be used.

Further examples of binders having ethylenically unsaturated groups comprise modified binders in which crosslinkable groups are introduced into the polymeric molecule by grafting reactions.

The second group comprises those elastomeric binders which have functional groups. The functional groups are crosslinkable thermochemically, by means of electron beams, photochemically or by means of any desired combination of these processes. In addition, mechanical reinforcement by means of fillers can be carried out. Examples of suitable functional groups comprise —Si(HR)O—, —Si(RR')O—, —OH, —NH$_2$, —NHR, —COOH, —COOR, —COHN$_2$, —O—C(O)NHR, —SO$_3$H or —CO—. Examples of binders comprise silicone elastomers, acrylate rubbers, ethylene/acrylate rubbers, ethylene/acrylic acid rubbers or ethylene/vinyl acetate rubbers and the partly hydrolyzed derivatives thereof, thermoplastic elastomeric polyurethanes, sulfonated polyethylenes or thermoplastic elastomeric polyesters.

Of course, it is also possible to use elastomeric binders which have both ethylenically unsaturated groups and functional groups. Examples comprise addition-crosslinking silicone elastomers having functional and ethylenically unsaturated groups, copolymers of butadiene with (meth)acrylates, (meth)acrylic acid or acrylonitrile, and furthermore copolymers or block copolymers of butadiene or isoprene with styrene derivatives having functional groups, for example block copolymers of butadiene and 4-hydroxystyrene.

The third group of binders comprises those which have neither ethylenically unsaturated groups nor functional groups. Polyolefins or ethylene/propylene elastomers or products obtained by hydrogenation of diene units, such as, for example, SEBS rubbers, may be mentioned here by way of example.

Polymer layers which comprise binders without ethylenically unsaturated or functional groups must as a rule be mechanically reinforced, reinforced with the aid of high-energy radiation or a combination thereof in order to permit optimum crisp structurability by means of lasers.

It is of course also possible to use mixtures of two or more binders, which may comprise both binders from in each case only one of the groups described or mixtures of binders from two or all three groups. The possible combinations are limited only in so far as the suitability of the polymer layer for the laser structuring process and the molding process must not be adversely influenced. Advantageously, it is possible to use, for example, a mixture of at least one elastomeric binder which has no functional group with at least one further binder which has functional groups or ethylenically unsaturated groups.

The amount of elastomeric binder or binders in the elastomeric layer is usually from 30% by weight to 99% by weight, based on the sum of all components, preferably from 40 to 95% by weight and very particularly preferably from 0.50 to 90% by weight.

The laser-engravable polymer layer can optionally also comprise reactive low molecular weight or oligomeric compounds. Oligomeric compounds generally have a molecular weight of not more than 20 000 g/mol. Reactive low molecular weight and oligomeric compounds are to be referred to below as monomers for the sake of simplicity.

Monomers can firstly be added for increasing the rate of the photochemical or thermochemical crosslinking or of the crosslinking by means of high energy radiation, if this is desired. With the use of elastomeric binders from the first and second groups, the addition of monomers for acceleration is generally not absolutely essential. In the case of elastomeric binders from the third group, the addition of monomers is as a rule advisable without being absolutely essential in every case.

Regardless of the question of the crosslinking rate, monomers can also be used for controlling the crosslinking density. Depending on the type and amount of the low molecular weight compounds added, further or denser networks are obtained. Firstly, monomers used may be known ethylenically unsaturated monomers. The monomers should be substantially compatible with the binders and have at least one photochemically or thermochemically reactive group. They should not be readily volatile. The boiling point of suitable monomers is preferably not less than 150° C. Amides of acrylic acid or methacrylic acid with mono- or polyfunctional alcohols, amines, amino alcohols or hydroxyethers and hydroxyesters, styrene or substituted styrenes, esters of fumaric or maleic acid or allyl compounds are particularly suitable. Examples comprise butyl acrylate, 2-ethylhexyl acrylate, lauryl acrylate, 1,4-butanediol diacrylate, 1,6-hexanediol diacrylate, 1,6-hexanediol dimethacrylate, 1,9-nonanediol diacrylate, trimethylolpropane trimethacrylate, trimethylolpropane triacrylate, dipropylene glycol diacrylate, tripropylene glycol diacrylate, dioctylfumarate, N-dodecylmaleimide and triallyl isocyanurate.

Monomers particularly suitable for the thermochemical reinforcement comprise reactive low molecular weight silicones, such as, for example, cyclic siloxanes, Si—H-functional siloxanes, siloxanes having alkoxy or ester groups, sulfur-containing siloxanes and silanes, dialcohols, such as, for example, 1,4-butanediol, 1,6-hexanediol, 1,8-octanediol and 1,9-nonanediol, diamines, such as, for example, 1,6-hexanediamine and 1,8-octanediamine, amino alcohols, such as, for example, ethanolamine, diethanolamine and butylethanolamine, and dicarboxylic acids, such as, for example, 1,6-hexanedicarboxylic acid, terephthalic acid, maleic acid or fumaric acid.

It is also possible to use monomers which have both ethylenically unsaturated groups and functional groups. ω-Hydroxyalkyl acrylates, such as, for example, ethylene glycol mono(meth)acrylate, 1,4-butanediol mono(meth)acrylate or 1,6-hexanediol mono(meth)acrylate, may be mentioned as examples.

It is of course also possible to use mixtures of different monomers, provided that the properties of the elastomeric layer are not adversely influenced by the mixture. As a rule, the amount of added monomers is from 0 to 40% by weight, based on the amount of all components of the recording layer, preferably from 0 to 20% by weight.

The elastomeric laser-engravable layer may furthermore comprise additives and assistants, such as, for example, IR absorbers, dyes, dispersants, antistatic agents, plasticizers and abrasive particles. However, the amount of such additives should as a rule not exceed 30% by weight, based on the amount of all components of the elastomeric layer.

The laser-engravable layer can also be composed of a plurality of individual layers. These part-layers may be of the same, approximately the same or different material composition. The thickness of the laser-engravable layer or of all individual layers together is as a rule from 0.1 to 10 mm, preferably from 0.5 to 3 mm. The thickness is suitably chosen by the person skilled in the art, depending on application-related and machine-related process parameters of the laser engraving process and of the molding process.

The laser-engravable layer can optionally furthermore have a top layer having a thickness of not more than 300 μm. The composition of such a top layer can be chosen with regard to optimum engravability and mechanical stability, while the composition of the layer underneath is chosen with regard to optimum hardness or resilience. The top layer must either itself be engravable or must at least be removable together with the layer underneath in the course of the laser-engraving. It comprises at least, one polymeric binder. It may furthermore comprise an absorber for laser radiation or monomers or assistants.

The starting material for the process can be prepared, for example, by dissolving or dispersing all components in a suitable solvent and pouring onto a substrate. In the case of multilayer elements, a plurality of layers can be cast one on top of the other in a manner known in principle. If the "wet-in-wet" method is employed, the layers bond well to one another. A top layer can also be poured on. Alternatively, the individual layers can be cast, for example, on temporary substrates and the layers subsequently bonded to one another by lamination. After the casting, a cover sheet for protecting the starting material from damage can also optionally be employed.

However, thermoplastic elastomeric binders or silicone elastomers are very particularly advantageously used for the process according to the invention. With the use of thermoplastic elastomeric binders, the production is preferably effected by extrusion between a substrate sheet and a cover sheet or a top element, followed by calendering, as disclosed, for example, for flexographic printing elements in EP-A 084 851. In this way, thicker layers can be produced in a single operation. Multilayer elements can be produced by means of coextrusion.

The laser-engravable layer is reinforced by heating (thermochemically), by exposure to UV light (photochemically) or by exposure to high-energy radiation (actinically) or by any desired combination thereof.

Thereafter, the layer or the layer composite is applied to a cylindrical (temporary) substrate, for example of plastic, glass fiber-reinforced plastic, metal or foam, for example by means of self-adhesive tape, reduced pressure, clamping apparatuses or magnetic forces, and engraved as described above. Alternatively, the planar layer or layer composite can also be engraved as described above. Optionally, the laser-engravable layer is washed using a rotary cylindrical washer or a continuous washer with a cleaning agent for removing engraving residues during the laser engraving process.

In the manner described, the die can be produced as a negative die or as a positive die.

In a first variant, the die has a negative structure so that the coating which can be bonded to a sheet-like substrate, for example a leather, can be obtained directly by application of a liquid plastic material to the surface of the die and subsequent solidification of the plastic material.

In a second variant, the die has a positive structure so that a negative die is first produced from the laser-structured positive die by molding. The coating which can be bonded to a sheet-like substrate can then be obtained from this negative die by application of a liquid plastic material to the surface of the negative die and subsequent solidification of the plastic material.

Preferably, structure elements having dimensions in the range from 10 to 500 μm are engraved into the die. The structure elements may be in the form of elevations or depressions. Preferably, the structure elements have a simple geometric shape and are, for example, circles, ellipses, squares, rhombuses, triangles and stars. The structure elements may form a regular or irregular screen. Examples are a classical dot screen or a stochastic screen, for example a frequency-modulated screen.

Figure 1:
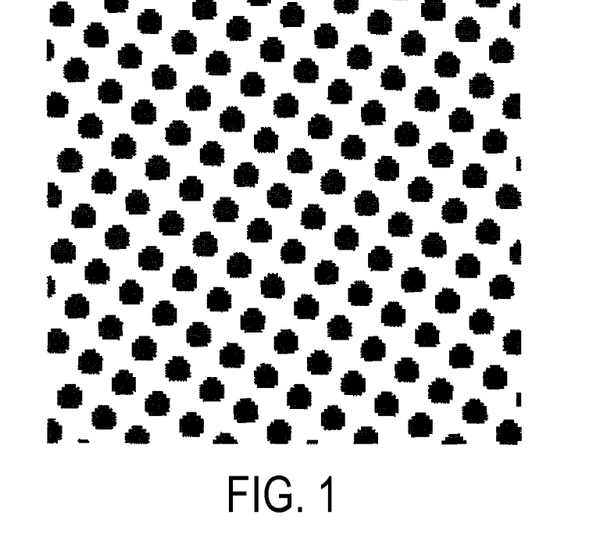
FIG. 1 shows an autotypical dot screen.
Figure 2:
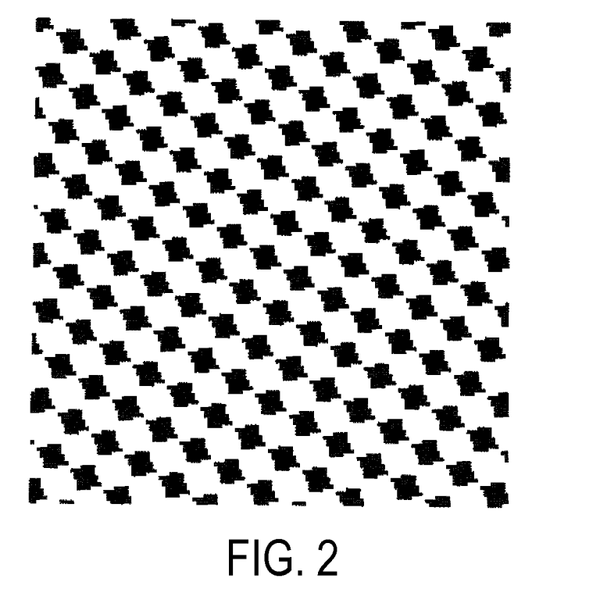
FIG. 2 shows an autotypical rhombus screen.
Figure 3:
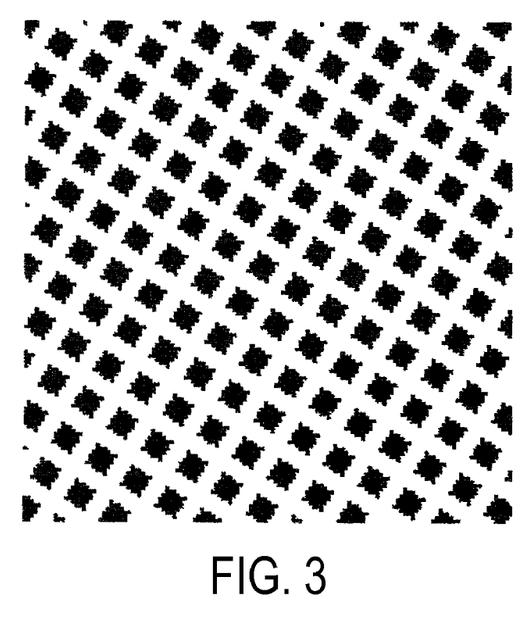
FIG. 3 shows an autotypical square screen.
Figure 4:
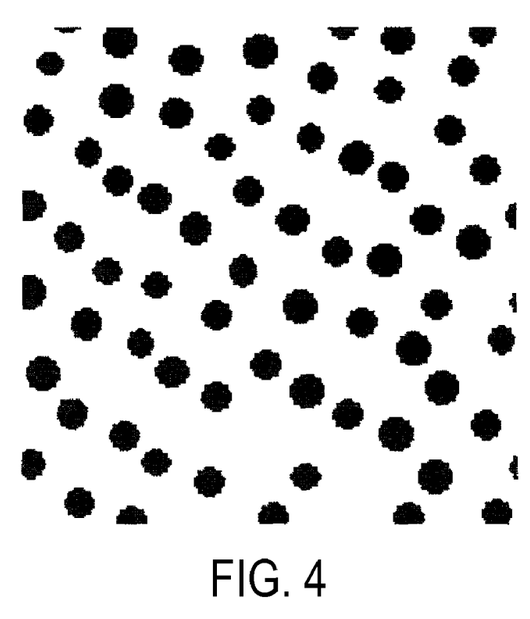
FIG. 4 shows an amplitude- and frequency-modulated screen (stochastic screen).

Examples of preferred screens are shown in FIGS. 1-4.
FIG. 1 shows an autotypical dot screen,
FIG. 2 shows an autotypical rhombus screen,
FIG. 3 shows an autotypical square screen,
FIG. 4 shows an amplitude- and frequency-modulated screen (stochastic screen).

Here, an autotypical screen is a regular screen in which the spacing of the midpoints of the screen element have defined values and the angles of the screen axes have a defined value.

In the case of a frequency-modulated screen, the size of the screen elements is constant but spacing and angle of the elements vary randomly.

In the case of an amplitude-modulated screen, the size of the screen elements varies randomly.

For example, the die can be engraved so that it has "wells" (depressions) which have a diameter of 10-500 μm on the surface of the die. The diameter is preferably 20-250 μm and particularly preferably 30-150 μm. The spacing of the wells is in general 10-500 μm, preferably 20-200 μm, particularly preferably 20-80 μm. The tonal values of the screen are in general from 3% to 50%.

Very particularly preferred screens for dies for the production of leather finishes are characterized as follows:

If it is a negative die, the following patterns are preferably engraved into the surface of the die for producing the coarse structure:

Inverted autotypical screen having a substantially circular dot shape; dot diameter preferably from 20 to 250 μm, particularly preferably from 20 to 80 μm Inverted frequency-modulated or frequency and amplitude-modulated screen having a substantially circular dot shape, dot diameter preferably from 20 to 150 μm; tonal value preferably from 3 to 40%, particularly preferably from 5 to 30%

If it is a positive die, the following patterns are preferably engraved into the surface of the die for producing the coarse structure:

Autotypical screen having a substantially circular dot shape; dot diameter preferably from 20 to 250 μm, in particular from 20 to 80 μm; frequency-modulated or frequency- and amplitude-modulated screens having a substantially circular dot shape, dot diameter preferably from 20 to 150 μm, tonal values preferably from 3 to 40%, particularly preferably from 5 to 30%.

However, the wells can also have another cross section, for example an elliptical or polygonal cross section. The depth of the wells is as a rule from 20 to 500 μm, preferably from 310 to 200 μm and particularly preferably from 60 to 200 μm. Such a die is used in general as a negative die for the production of leather finishes. A corresponding positive die can likewise be produced by laser engraving. This has the structure elements described in the form of elevations ("tiny hairs"). These have dimensions corresponding to the negative structure elements (depressions) described above.

In addition to a coarse surface structure, the die preferably also has a fine surface structure. Both coarse and fine structure can be produced by laser engraving. The fine structure may be, for example, a microroughness having a roughness amplitude in the range from 1 to 30 μm and a roughness frequency of from 0.5 to 30 μm. The dimensions of the roughness are preferably in the range from 1 to 20 μm, particularly preferably from 2 to 15 μm and particularly preferably from 3 to 10 μm.

The die preferably additionally has a rough surface as fine surface structure, the dimensions of the roughness of the fine surface structure being smaller than the structure elements produced by means of laser structuring. Ideally, the roughness of the surface of the die is formed so that the coating formed by application of a liquid plastic material to the surface of the die and subsequent solidification of the plastic material has a gloss, according to DIN 67530, of less than 2.2 at an angle of incidence of 60°.

A rough surface structure can be produced either before, during or after the laser structuring. For example, the laser-structurable layer can be brought into contact with a rough surface before the reinforcement process so that the structure of this rough surface is reproduced on the die, if appropriate also with application of temperature and/or pressure. The recording layer is then reinforced as described.

In a further embodiment, it has proven particularly advantageous to produce the microroughness only in the course of the production of the coating, for example with the aid of a special polyurethane dispersion which, after solidification, comprises insoluble particles having a mean diameter of from 1 to 20 μm. In this case, it is not necessary to produce the microroughness by means of laser structuring, and it is sufficient instead merely to engrave depressions or elevations of the dimensions described above by means of a laser into the surface of the die. Coatings which are produced using such polyurethane dispersions can be polished down only to a very small degree, i.e. they do not substantially change their low gloss even in the case of friction, for example as a result of use. Such polyurethane dispersions are commercially available, for example, under the name Novomatt GG (BASF Aktiengesellschaft).

Figure 5:
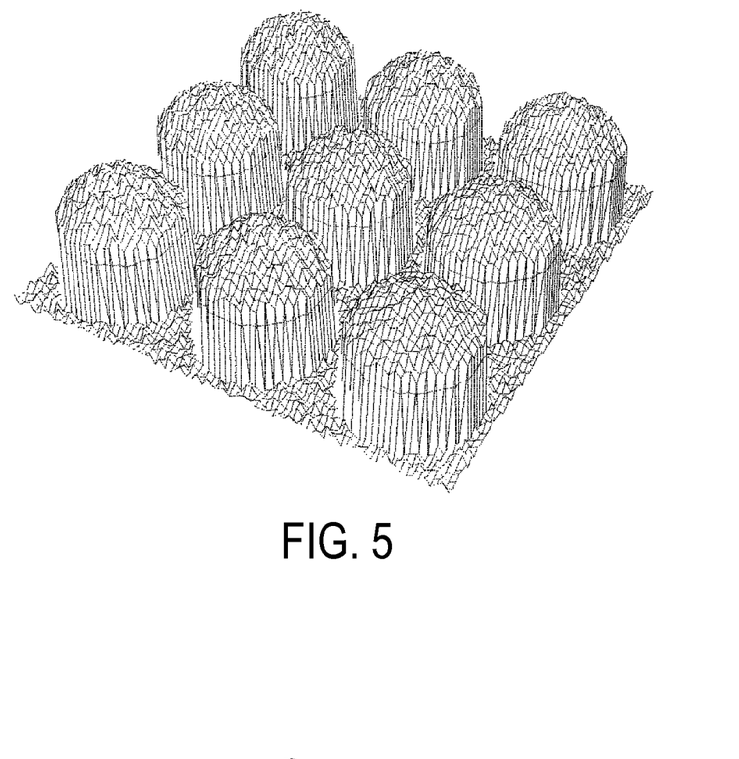
FIG. 5 shows thick tiny hairs having little roughness.
Figure 6:
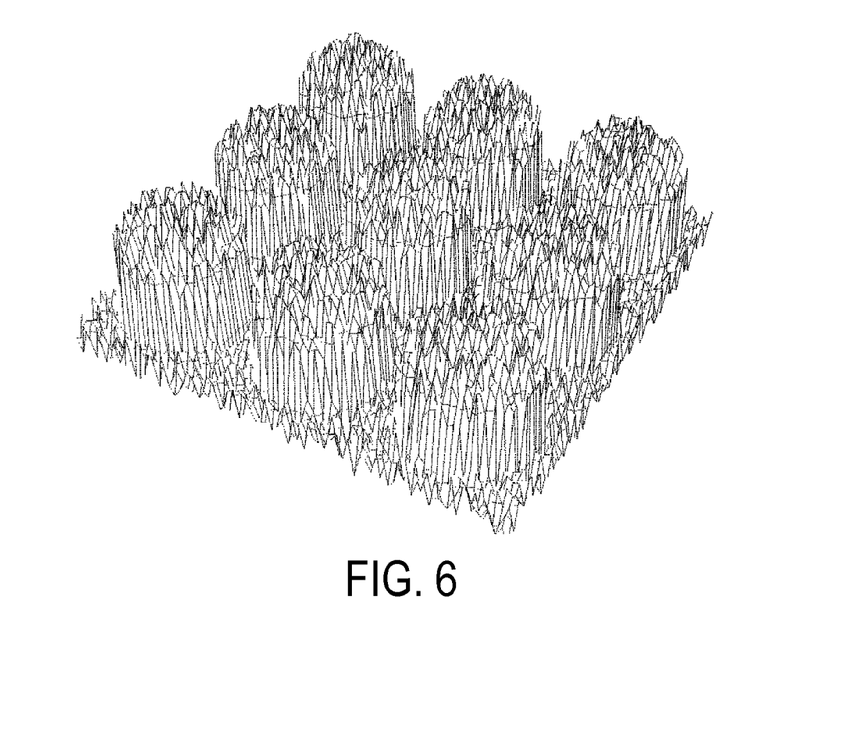
FIG. 6 shows thick tiny hairs having great roughness.
Figure 7:
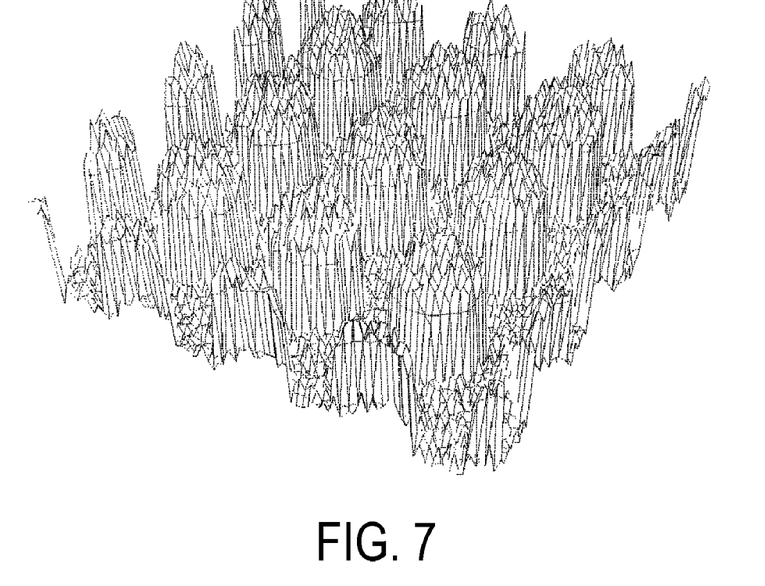
FIG. 7 shows thin tiny hairs having medium roughness.

Examples of laser-engraved coarse and fine structures are shown in FIGS. 5-7.

Figure 8:
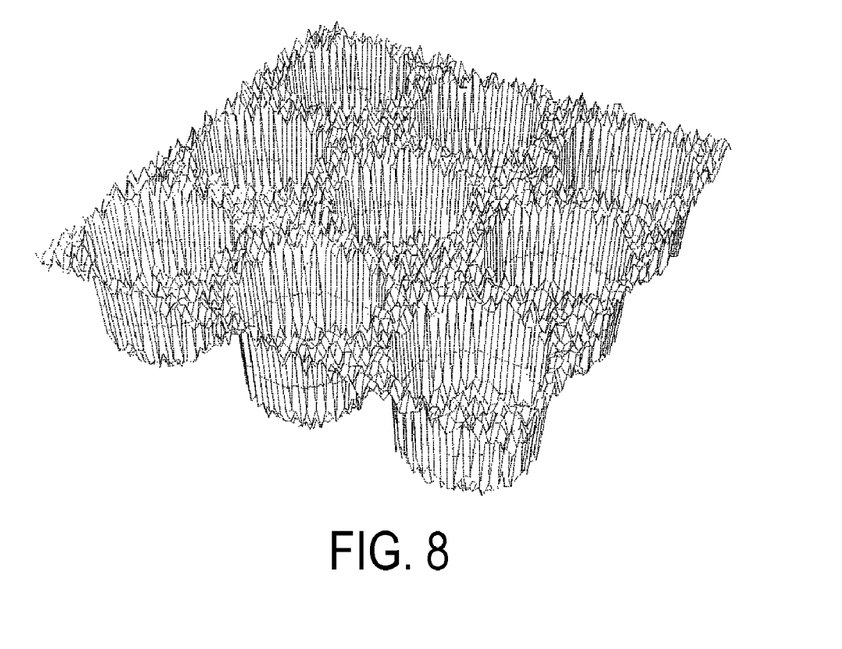
FIG. 8 shows thick wells having medium roughness.

FIG. 5 shows thick tiny hairs having little roughness,
FIG. 6 shows thick tiny hairs having great roughness,
FIG. 7 shows thin tiny hairs having medium roughness,
FIG. 8 shows thick wells having medium roughness.

Furthermore, the roughness can be produced in the course of laser structuring directly on the die by additionally superposing a finer pattern of finer structure elements on a pattern (screen) of coarse structure elements, for example an interference pattern in the form of amplitude-/height-modulated noise, a fine, irregular pattern or an autotypical or frequency-modulated screen which is finer than the coarse structure. This can be effected using one and the same laser or using different lasers. For example, a first laser beam can engrave the coarse structure in the die while a second laser beam engraves the fine structure. Different laser types (e.g. $CO_2$ laser and Nd/YAG laser) can be used for this purpose, depending on the required resolution. Structures of animal hides can also be engraved into the dies.

IR lasers are particularly suitable for the laser engraving. However, it is also possible to use lasers having shorter wavelengths, provided that the laser has sufficient intensity. For example, it is possible to use a frequency-doubled (532 nm) or frequency-tripled (355 nm) Nd/YAG laser, or an excimer laser (e.g. 248 nm). For example, a $CO_2$ laser having a wavelength of 10 640 nm can be used for the laser engraving. Lasers having a wavelength of from 600 to 2000 nm are particularly preferably used. For example, Nd/YAG lasers (1064 nm), IR diode lasers or solid-state lasers can be used. Nd/YAG lasers are particularly preferred. The image information to be engraved is transferred directly from the lay-out computer system to the laser apparatus. The laser can be operated either continuously or in a pulsed mode.

As a rule, the die obtained can be used directly. If it is desired, the die obtained can also be subsequently cleaned. As a result of such a cleaning step, layer components which have been detached or possibly not yet completely removed from the surface are removed. As a rule, simple treatment with water, water/surfactant, alcohols or inert, low-swelling, organic cleaning agents is sufficient.

The process according to the invention can be carried out in a single production operation in which all process steps are carried out in succession. Advantageously, however, the process can also be interrupted after the reinforcement step. The reinforced die can be completed and stored and can be further processed only at a later time and by means of a laser engraving to give an image-bearing die. Here, it is advantageous to protect the die with a temporary cover sheet, for example comprising PET, which is peeled off again before the laser engraving.

The dies produced according to the invention are used, inter alia, for the production of surface-structured finishes for leather. For this purpose, a liquid plastic material is applied to the negative die and allowed to solidify. First, a negative die is produced from a laser-engraved positive die.

On the basis of the dies produced according to the invention, it is also possible to produce surface-structured plastics layers for the coating of textile surfaces, paper substrates, such as wallpapers, and furniture surfaces.

The invention also relates to a process for the production of plastics layers provided with a surface structure for the coating of surfaces, such as, for example, leather, textiles, nonwovens, wallpapers and rigid decorative surfaces, using the laser-structured dies, comprising the steps:
i) producing a negative die by laser engraving,
ii) applying a liquid plastic material to the structured surface of the negative die and allowing the plastic material to solidify.

Suitable liquid plastic materials are plastic dispersions, preferably solvent-free, aqueous plastic dispersions, particularly preferably aqueous polyurethane dispersions. The plastic dispersions may comprise hollow microspheres which form closed cells in the finish. Special plastic dispersions which are suitable for the production of finishes for leather are disclosed in WO 2005/035795.

The plastic composition can, for example, be sprayed onto the die or applied to the latter by means of a knife coater.

With the use of a positive die, the process according to the invention comprises the following steps:
i) producing a positive die by laser engraving,
ii) applying a polymer composition to the structured surface of the positive die and reinforcing the composition photochemically, thermochemically or actinically, an elastomeric negative die being obtained,
iii) applying a liquid plastic material to the structured surface of the negative die and allowing the plastic dispersion to solidify.

A silicone rubber is preferably applied to the surface of the positive die.

The invention furthermore relates to a process for finishing of leather, comprising the steps:
i) producing a negative die,
ii) applying a liquid plastic material to the structured surface of the negative die and allowing the plastic material to solidify,
or
i) producing a positive die and
ii) applying a polymer composition to the structured surface of the positive die and reinforcing the composition photochemically, thermochemically or actinically, an elastomeric negative die being obtained, and
iii) applying a liquid plastic material to the structured surface of the negative die and allowing the plastic dispersion to solidify,
in each case a plastics layer having a surface structure being obtained, and
iv) bonding the plastics layer on the side facing away from the surface-structured side to the surface of the leather, the bond being produced by one or more further layers.

Step iv) can be carried out as described in WO 2005/047549. Accordingly, a substrate provided on its visible side with a finish having a grain structure, in particular a grain leather, a split leather having a buffed top or a synthetic suede material having a top consisting of microfibers, is produced, first, for the formation of the finish, an aqueous plastic dispersion being applied to the die which has a structured surface corresponding to the grain structure of the finish, and being allowed to solidify to form a film. A plastic dispersion forming a bonding layer is applied to the top of a substrate, and the substrate is placed with this top on the film and subjected to a pressure and heat treatment.

The invention is explained in more detail by the following examples.

EXAMPLE 1

A laser-engravable silicone polymer layer having a smooth surface based on a room temperature-curing filler-containing 2-component silicone elastomer was produced by thoroughly mixing the two components with one another and applying them with the aid of a knife coater to a temporary PET cover sheet. The silicone layer was allowed to cure for 16 hours at room temperature, and the elastomeric silicone layer thus chemically reinforced was fixed with the aid of a silicone adhesive on a woven polyester fabric as a substrate element. The reinforced elastomeric polymer layer obtained after removal of the temporary PET cover sheet and having a woven fabric substrate had a total layer thickness of 1.7 mm. The layer composite obtained was converted into sheet pieces of about 40×100 cm before the subsequent structuring by means of a laser.

EXAMPLE 2

A laser-engravable layer having a rough surface based on a room temperature-curing filler-containing 2-component silicone elastomer was produced by thoroughly mixing the two components with one another and applying them with the aid of a knife coater to a temporary microrough PET cover sheet. After curing for 16 hours at room temperature, the chemically reinforced elastomeric silicone layer was fixed with the aid of a silicone adhesive on a woven polyester fabric as a substrate element. The reinforced elastomeric layer obtained after removal of the temporary microrough PET cover sheet and having a woven fabric substrate had a total layer thickness of 1.7 mm. The layer composite obtained was converted into sheet pieces of about 40×100 cm before the subsequent structuring by means of a laser.

EXAMPLE 3

The laser-engravable laser used was a commercial laser-structurable flexographic printing plate (Nyloflex® LD1, BASF Drucksysteme GmbH) having a total layer thickness of 1.14 mm on a PET sheet substrate having a layer thickness of 0.125 mm.

In the following examples, a $CO_2$ laser engraving machine of the type BDE 4131 (from Stork Prints Austria GmbH, Kufstein) was used for structuring the laser-engravable layer. The machine has 3 sealed $CO_2$ lasers having a rated power of 250 W each, the appropriate optical components and the associated peripherals for control, laser cooling, waste air measurement and waste air treatment. The cylindrical holding system consists either of a thin-walled cylindrical metal drum or of metal cones into which a so-called print sleeve, consisting of a (generally multilayer) hollow cylinder comprising one or more plastics, is clamped. The laser is controlled by a connected control computer by means of special output software. The output software interprets the motif present in the form of a gray step bitmap as a pixel-by-pixel height profile. Each gray step corresponds to a certain engraving depth or engraving power at the relevant point of the motif. Ideally, the relationship between gray-step values and engraving depth is adjusted to be approximately linear.

The unprocessed die is present in the form of a planar layer and is fixed on the cylindrical holding element for the duration of the engraving. During the engraving process, the rotating cylindrical holding element with the die to be processed is displaced in the axial direction uniformly relative to the laser beam. In this way, the laser beam covers the entire die surface to be processed.

The die according to example 1 was engraved with a motif which consisted of a combination of the following two individual motifs.

| Motif No. | Function | Motif type |
|---|---|---|
| 1 | Wells | Wells having diameter = 72 µm midpoint spacing = 100 µm (in the form of an inverted autotypical screen of 100 l/cm = 254 lpi at a tonal value of 40%) |
| 2 | Microroughness | Roughness pattern with roughness amplitude = 30 µm roughness frequency = 30 µm | lpi = lines per inch

In this way, a die having a rough surface and about 10 000 wells/cm² was obtained. The depth of the engraved wells was about 80 µm. The die obtained was subsequently cleaned with the aid of a water/surfactant mixture used directly for the molding process. For this purpose, an aqueous plastic dispersion comprising hollow microspheres was applied to the die and solidified by removal of the water, according to WO 2005/035795. The plastics coating thus obtained was bonded to the surface of a split leather with the aid of a single bonding layer having a net-like structure, according to WO 2005/047549.

The coated leather obtained had a visually attractive, suede- or nubuck-like, matt surface having a pleasant handle.

EXAMPLE 4

The following motif was engraved into the already rough surface of the recording element according to example 2:

| Motif No. | Function | Motif type |
|---|---|---|
| 1 | Wells | Wells Diameter = 86 µm Midpoint spacing = 129 µm (in the form of an inverted regular screen of 78 l/cm = 197 lpi at a tonal value of 35%) |

In this way, a die having a rough surface and about 6000 wells/cm² was obtained. The depth of the engraved wells was about 120 µm. The die obtained was subsequently cleaned with the aid of a water/surfactant mixture used directly for the molding process. For this purpose, an aqueous plastic dispersion comprising hollow microspheres was applied to the die and solidified by removal of the water, according to WO 2005/035795. The plastics coating thus obtained was bonded to the surface of a split leather with the aid of a single bonding layer having a net-like structure, according to WO 2005/047549.

The coated leather obtained had a visually attractive, suede- or nubuck-like, matt surface having a very pleasant handle.

EXAMPLE 5

The laser-engravable layer used was a commercially available laser-structurable flexographic printing plate (nyloflex®

LD1, BASF Drucksysteme GmbH) having a total layer thickness of 1.14 mm on a PET sheet substrate having a layer thickness of 0.125 mm.

The die was engraved with a motif which consisted of a combination of the following two individual motifs:

| Motif No. | Function | Motif type |
|---|---|---|
| 1 | Tiny hairs | Tiny hairs<br>Diameter = 72 μm<br>Midpoint spacing = 114 μm<br>(in the form of an autotypical screen of 88 l/cm = 223 lpi at a tonal value of 31%) |
| 2 | Microroughness | Roughness pattern<br>Roughness amplitude = 30 μm<br>Roughness frequency = 30 μm |

In this way, a positive die having a rough surface and about 7500 wells/cm$^2$ was obtained. The height of the tiny hairs remaining after the engraving was about 100 μm. The die obtained was subsequently cleaned with the aid of a non-swelling, organic cleaning agent. With the aid of a room temperature-curing, filler-containing 2-component silicone elastomer, a negative die was produced from the positive die by thoroughly mixing the two components of the silicone elastomer with one another and applying the mixture with the aid of a knife coater to the positive die. After curing at room temperature for a duration of 16 hours, the corresponding negative die for the subsequent production of the plastics coating was obtained.

According to WO 2005/035795, an aqueous plastic dispersion comprising hollow microspheres was applied to the negative die comprising silicone and solidified by removal of the water. The plastics coating thus obtained was bonded to the surface of a split leather with the aid of a single bonding layer having a net-like structure, according to WO 2005/047549.

The coated leather obtained had a visually attractive, suede-like, predominantly matt surface having a pleasant handle.

EXAMPLE 6

The recording element according to example 5 was engraved with a motif which consisted of a combination of the following two individual motifs:

| Motif No. | Function | Motif type |
|---|---|---|
| 1 | Tiny hairs | Tiny hairs<br>Diameter = 43 μm<br>Midpoint spacing = 100 μm<br>(in the form of a regular screen of 100 l/cm = 254 lpi at a tonal value of 14%) |
| 2 | Microroughness | Roughness pattern<br>Roughness amplitude = 40 μm<br>Roughness frequency = 40 μm |

In this way, a positive die having a rough surface and about 10 000 wells/cm$^2$ was obtained. The height of the tiny hairs remaining after the engraving was about 80 μm. The die obtained was subsequently cleaned with the aid of a non-swelling, organic cleaning agent. With the aid of a room temperature-curing, filler-containing 2-component silicone elastomer, a negative die was produced from the positive die by thoroughly mixing the two components of the silicone elastomer with one another and applying the mixture with the aid of a knife coater to the positive die. After curing at room temperature for a duration of 16 hours, the corresponding negative die for the subsequent production of the plastics coating was obtained. According to WO 2005/035795, an aqueous plastic dispersion comprising hollow microspheres was applied to the negative die comprising silicone and solidified by removal of the water. The plastics coating thus obtained was bonded to the surface of a split leather with the aid of a single bonding layer having a net-like structure, according to WO 2005/047549.

The coated leather obtained had a visually attractive, suede-like, matt surface having a pleasant handle.

EXAMPLE 7

The recording element according to example 5 was engraved with a motif which consisted only of an individual motif for the elevations (tiny hairs) according to the invention:

| Motif No. | Function | Motif type |
|---|---|---|
| 1 | Tiny hairs | Tiny hairs<br>Diameter = 57 μm<br>Midpoint spacing = 100 μm<br>(in the form of a regular screen of 100 l/cm = 254 lpi at a tonal value of 26%) |

In this way, a positive die without additional microroughness, having about 10 000 wells/cm$^2$, was obtained. The height of the tiny hairs remaining after the engraving was about 80 μm. The die obtained was subsequently cleaned with the aid of a non-swelling, organic cleaning agent. With the aid of a room temperature-curing, filler-containing 2-component silicone elastomer, a negative die was produced from the positive die by thoroughly mixing the two components with one another and applying them with the aid of a knife coater to the positive die. After curing at room temperature for a duration of 16 hours the corresponding negative die for the subsequent production of the plastics coating was obtained.

Thereafter, on the basis of WO 2005/035795, an aqueous plastic dispersion comprising hollow microspheres was applied to the negative die comprising silicone, Novomatt GG (BASF Aktiengesellschaft) being used as the polyurethane dispersion component. The plastics coating obtained after removal of the water at 80° C. was bonded to the surface of a split leather with the aid of a single bonding layer having a net-like structure, according to WO 2005/047549.

The coated leather obtained had a visually extremely attractive, suede-like, highly matt surface having a very pleasant handle.

We claim:
1. A process for the production of a negative or positive die for the production of a surface-structured coating which can be bonded to a sheet-like substrate, and which is formed by application of a liquid plastic material to the surface of the die and subsequent solidification of the plastic material, the die having a surface structure corresponding to the surface structure of the coating,
   wherein the surface structure contains structure elements in the form of elevations or depressions having a diameter in the range from 10 to 500 μm, a depth or height, respectively, in the range from 20 to 500 μm and a spacing in the range from 10 to 500 μm, wherein structure elements on the surface of the die form an autotypical screen, an amplitude-modulated screen, a frequency-modulated screen or a stochastic screen, and wherein the structure elements are produced by laser engraving, and wherein the die has a fine surface structure in addition to a coarse surface structure, and the fine surface structure has a micro-roughness having a roughness amplitude in the range from 1 to 30 μm and a roughness frequency of from 0.5 to 20 μm.

2. The process according to claim 1, comprising the steps:
a) provision of a laser-engravable elastomeric layer or of a layer composite comprising a laser-engravable elastomeric layer, optionally on a substrate, the laser-engravable layer comprising a binder and further additives and assistants,
b) thermochemical, photochemical or actinic reinforcement of the laser-engravable elastomeric layer, and
c) engraving of a die surface structure corresponding to the surface structure of the finish into the laser-engravable elastomeric layer using a laser.

3. The process according to claim 2, wherein the surface structure of the die in step c) is produced by applying the laser-engravable layer or the layer composite to a cylinder and causing the cylinder to rotate, and moving the cylinder in the axial direction and modulating the laser under electronic control according to the movement of the cylinder.

4. The process according to claim 2, wherein the surface structure of the die in step c) is produced by arranging the laser-engravable layer or the layer composite in a planar manner and moving the laser-engravable layer and laser relative to one another in the plane of the layer or of the layer composite, and modulating the laser under electronic control according to the relative movement.

5. The process according to claim 2, wherein the engraving of the surface structure of the die is effected using an IR laser.

6. The process according to claim 2, wherein the structure elements are selected from circles, ellipses, squares, rhombuses, triangles, stars and further simple geometric shapes.

7. The process according to claim 1, wherein the surface structure of the die is produced by applying the laser-engravable layer or the layer composite to a cylinder and causing the cylinder to rotate, and moving the cylinder in the axial direction and modulating the laser under electronic control according to the movement of the cylinder.

8. The process according to claim 7, wherein the engraving of the surface structure of the die is effected using an IR laser.

9. The process according to claim 1, wherein the surface structure of the die is produced by arranging the laser-engravable layer or the layer composite in a planar manner and moving the laser-engravable layer and laser relative to one another in the plane of the layer or of the layer composite, and modulating the laser under electronic control according to the relative movement.

10. The process according to claim 9, wherein the engraving of the surface structure of the die is effected using an IR laser.

11. The process according to claim 1, wherein the engraving of the surface structure of the die is effected using an IR laser.

12. The process according to claim 1, wherein the structure elements are selected from circles, ellipses, squares, rhombuses, triangles, stars and further simple geometric shapes.

13. The process according to claim 1, wherein both coarse and fine structure are produced by laser engraving.

14. The process according to claim 1, wherein the roughness frequency is from 1 to 20 μm.

15. The process according to claim 1, wherein the roughness frequency is from 2 to 15 μm.

16. The process according to claim 1, wherein the roughness frequency is from 3 to 10 μm.

17. A process for the production of a plastics layer having a surface structure for the coating of surfaces, comprising the steps:
i) producing a negative die by the process according to claim 1, and
ii) applying a liquid plastic material to the structured surface of the negative die and allowing the plastic material to solidify.

18. A process for the production of a plastics layer having a surface structure for the coating of surfaces, comprising the steps:
i) producing a positive die by the process according to claim 1,
ii) applying a polymer composition to the structured surface of the positive die and allowing said composition to solidify, an elastomeric negative die being obtained, and
iii) applying a liquid plastic material to the structured surface of the negative die and allowing the plastic material to solidify.

19. A process for the finishing of leather, comprising the steps:
i) producing a negative die by the process according to claim 1, and
ii) applying a liquid plastic material to the structured surface of the negative die and allowing the plastic material to solidify,
or
iii) producing a positive die by the process according to claim 1,
iv) applying a polymer composition to the structured surface of the positive die and allowing said composition to solidify, an elastomeric negative die being obtained,
v) applying a liquid plastic material to the structured surface of the negative die and allowing the plastic material to solidify in each case a plastics layer having a surface structure being obtained, and
vi) after step ii) or after step v) bonding the plastics layer on the side facing away from the surface-structured side to the surface of the leather, the bond being produced by one or more further layers.

* * * * *